(12) United States Patent
Cho et al.

(10) Patent No.: US 9,245,490 B1
(45) Date of Patent: Jan. 26, 2016

(54) DISPLAY DEVICE AND DATA DRIVING CIRCUIT THEREOF

(71) Applicant: LG Display Co., Ltd., Seoul (KR)

(72) Inventors: Soondong Cho, Gumi-si (KR); Hoon Jang, Goyang-si (KR); Hoonbae Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/733,643

(22) Filed: Jun. 8, 2015

(30) Foreign Application Priority Data

Dec. 24, 2014 (KR) ........................ 10-2014-0188925

(51) Int. Cl.
*G06F 3/044* (2006.01)
*G06F 3/041* (2006.01)
*G09G 3/36* (2006.01)

(52) U.S. Cl.
CPC .............. *G09G 3/3655* (2013.01); *G06F 3/044* (2013.01); *G06F 3/0412* (2013.01); *G06F 3/0418* (2013.01); *G09G 3/3688* (2013.01)

(58) Field of Classification Search
CPC .................................................. G06F 3/0412
See application file for complete search history.

(56) References Cited

U.S. PATENT DOCUMENTS

| 2012/0092322 | A1* | 4/2012 | Enjou | G09G 3/3688 345/211 |
| 2012/0242597 | A1* | 9/2012 | Hwang | G06F 3/0412 345/173 |
| 2013/0063404 | A1* | 3/2013 | Jamshidi Roudbari | G06F 3/044 345/204 |

FOREIGN PATENT DOCUMENTS

KR 10-1323044 B1 10/2013
KR 10-2014-0023567 A 2/2014

OTHER PUBLICATIONS

Korean Office Action, Korean Application No. 10-2014-0188925, Sep. 15, 2015, 5 pages (with concise explanation of relevance).

* cited by examiner

*Primary Examiner* — Nalini Mummalaneni
*Assistant Examiner* — Christopher Kohlman
(74) *Attorney, Agent, or Firm* — Fenwick & West LLP

(57) ABSTRACT

A touch display device includes a timing controller to generate a sync signal for controlling timing of a touch sensor driving period and a display driving period, where the display driving period comprises a first phase to drive odd signal lines according to a first polarity and to drive even signal lines according to a second polarity, a second phase to drive the odd signal lines according to the second polarity and to drive the even signal lines according to the first polarity, and a charge share period between the first phase and the second phase. A set of charge sharing switches couple the odd and even signal lines together during the charge share period and couple the odd and even signal lines together during the touch sensor driving period.

15 Claims, 9 Drawing Sheets

|  | Td | | | Tt |
|---|---|---|---|---|
|  | Odd Ch : P<br>Even Ch : N | Charge<br>Share | Odd Ch : N<br>Even Ch : P |  |
| SW1 | ON | OFF | OFF | OFF |
| SW2, 3 | OFF | OFF | ON | OFF |
| SW4 | OFF | ON | OFF | ON |
| SW5 | OFF | OFF | OFF | ON |

FIG. 9

DISPLAY DEVICE AND DATA DRIVING CIRCUIT THEREOF

CROSS-REFERENCE TO RELATED APPLICATION

This application claims the benefit of Korean Patent Application No. 10-2014-0188925 filed on Dec. 24, 2014, the entire contents of which is incorporated herein by reference for all purposes as if fully set forth herein.

BACKGROUND OF THE INVENTION

1. Field of the Invention

The described embodiments relate to a display device having touch sensors embedded in a pixel array and a data driving circuit thereof.

2. Discussion of the Related Art

A User Interface (UI) enables a person (i.e., a user) to easily control various electrical and electronic devices as he or she wants through communication between the user and the devices. Representative examples of the UI may include a keypad, a keyboard, a mouse, an On Screen Display (OSD), and a remote controller having an infrared communication or Radio Frequency (RF) communication function. UI technology continues to develop toward higher user sensibility and manipulation convenience. In recent years, the UI evolved into a touch UI, a voice recognition UI, and a 3D UI.

The touch UI is essentially adopted in portable information devices, such as smart phones and expanded to laptop computers, computer monitors, and home appliances. There has recently been proposed a technology in which touch sensors are embedded in the pixel array of a display panel (hereinafter called an "in-cell touch sensor"). In the in-cell touch sensor technology, touch sensors can be installed in a display panel without an increase in the thickness of the display panel. Such touch sensors are connected to pixels through parasitic capacitance. In a driving method, in order to reduce mutual influences attributable to the coupling of the pixels and the touch sensors, a 1 frame period may be subject to time division into a period in which the pixels are driven (hereinafter called a "display driving period") and a period in which the touch sensors are driven (hereinafter called a "touch sensor driving period").

In the in-cell touch sensor technology, an electrode connected to the pixels of the display panel is used as the electrode of the touch sensors. For example, the in-cell touch sensor technology may include a method of segmenting a common electrode for supplying a common voltage Vcom to the pixels of an LCD and using segmented common electrode patterns as the electrodes of the touch sensors.

Parasitic capacitance connected to the in-cell touch sensors is increased due to coupling between the in-cell touch sensors and the pixels. If parasitic capacitance is increased, touch sensitivity and touch recognition accuracy are deteriorated.

If an AC voltage having the same phase as a touch driving signal is supplied to the data lines of the display panel during the touch sensor driving period, parasitic capacitance of the touch sensor can be reduced because the amount of charges of the parasitic capacitance is reduced. In such a method, the data voltage of an input video is supplied to the data lines during the display driving period, and the AC voltage is supplied to the data lines during the touch sensor driving period. To this end, there is proposed a method of adding switch elements for switching the data voltage and the AC voltage in each output channel of a data drive Integrated Circuit (IC). However, such a method increases the chip size of the data drive IC and causes an increase in the IC cost.

SUMMARY OF THE INVENTION

In a first embodiment of a touch display device, a timing controller generates a sync signal for controlling timing of a touch sensor driving period and a display driving period in each of a plurality of frames, where the touch sensor driving period and the display driving period alternating with each other. A display panel comprises a plurality of display pixels having a common electrode segmented into a plurality of touch sensors. The plurality of display pixels display pixel data in response to data voltages during the display driving period. A touch sensor driving circuit supplies a touch sensor driving signal to the plurality of touch sensors during the touch sensor driving period and detects if a touch occurred based on a change in charge on the touch sensors. A plurality of positive polarity output buffers output positive polarity data voltages to the display pixels during the display driving period, and a plurality of negative polarity output buffers output negative polarity data voltages to the display pixels during the display driving period. A first set of switches couple the plurality of positive polarity output buffers to respective odd signal lines and couple the plurality of negative polarity output buffers to respective even signal lines during a first phase of the display driving period. A second set of switches couple the plurality of positive polarity output buffers to respective even signal lines during the display driving period. A third set of switches couple the plurality of negative polarity output buffers to respective odd signal lines during the second phase of the display driving period. A fourth set of switches couple the signals lines to each other during a charge share period between the first phase of the display driving period and the second phase of the display driving period, and couple the signals lines to each other during the touch sensor driving period.

In a second embodiment, a method of operating the touch display device described above is provided.

In a third embodiment, a touch display device includes a timing controller to generate a sync signal for controlling timing of a touch sensor driving period and a display driving period in each of a plurality of frames, where the touch sensor driving period and the display driving period alternating with each other. The display driving period comprises a first phase to drive odd signal lines according to a first polarity and to drive even signal lines according to a second polarity, a second phase to drive the odd signal lines according to the second polarity and to drive the even signal lines according to the first polarity, and a charge share period between the first phase and the second phase. A display panel comprises a plurality of display pixels having a common electrode segmented into a plurality of touch sensors. The plurality of display pixels display pixel data in response to data voltages during the display driving period. A touch sensor driving circuit supplies a touch sensor driving signal to the plurality of touch sensors during the touch sensor driving period and detects if a touch occurred based on a change in charge on the touch sensors. A set of charge sharing switches couple the odd and even signal lines together during the charge share period and couple the odd and even signal lines together during the touch sensor driving period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Hereinafter, exemplary embodiments of the present application are described with reference to the accompanying drawings. In the following description, a detailed description of known functions or constructions related to the present application will be omitted if it is deemed that such a description would make the gist of the present application unnecessarily vague.

A display device in accordance with an embodiment of the present application may be implemented into a flat panel display device, such as a Liquid Crystal Display (LCD), a Field Emission Display (FED), a Plasma Display Panel (PDP), an Organic Light Emitting Display (OLED), or an Electrophoresis Display (EPD). In the following embodiments, an LCD is chiefly described as an example of the flat panel display device, but the present application is not limited thereto. For example, the display device in accordance with an embodiment of the present application may be any display device top which the in-cell touch sensor technology can be applied.

Figure 1:
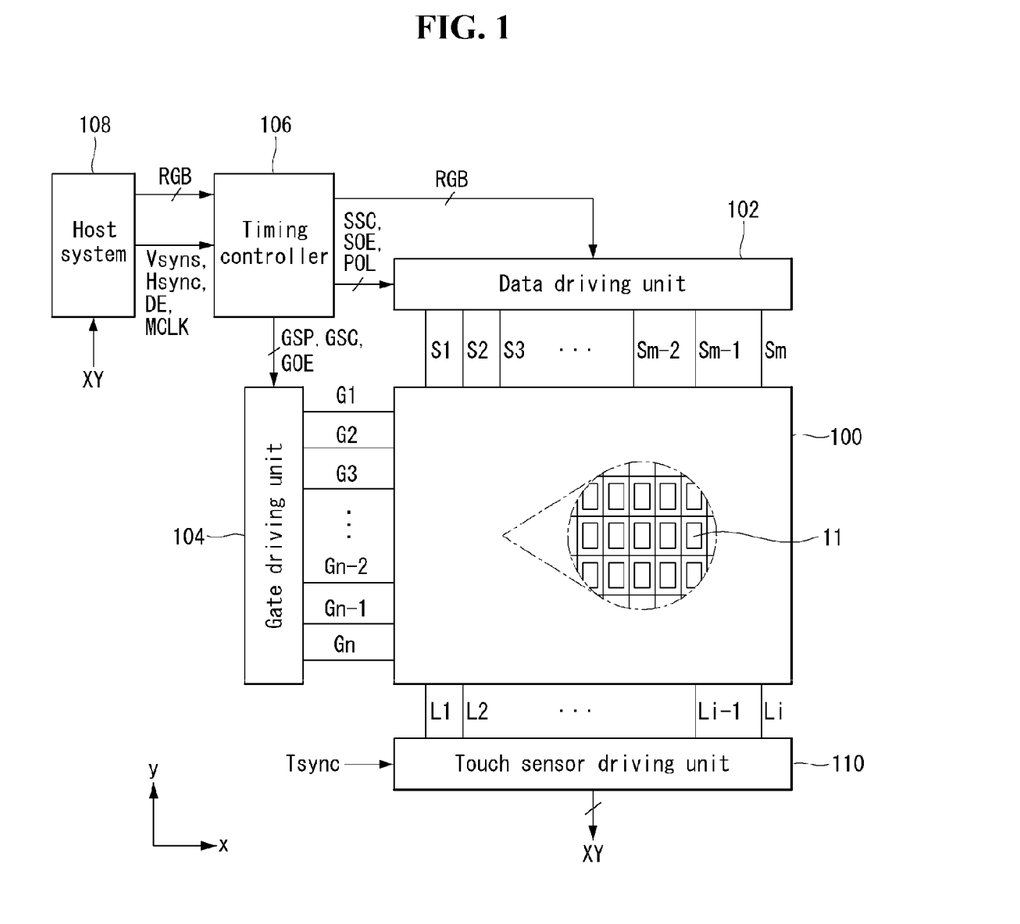
FIG. 1 is a block diagram schematically illustrating a display device in accordance with an embodiment of the present application.
Figure 2:
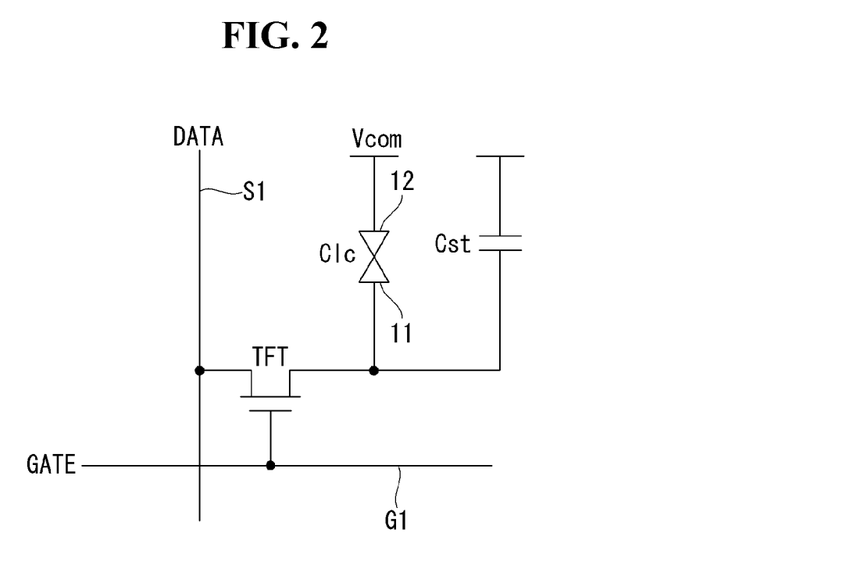
FIG. 2 is an equivalent circuit diagram of a pixel of an LCD.
Figure 3:
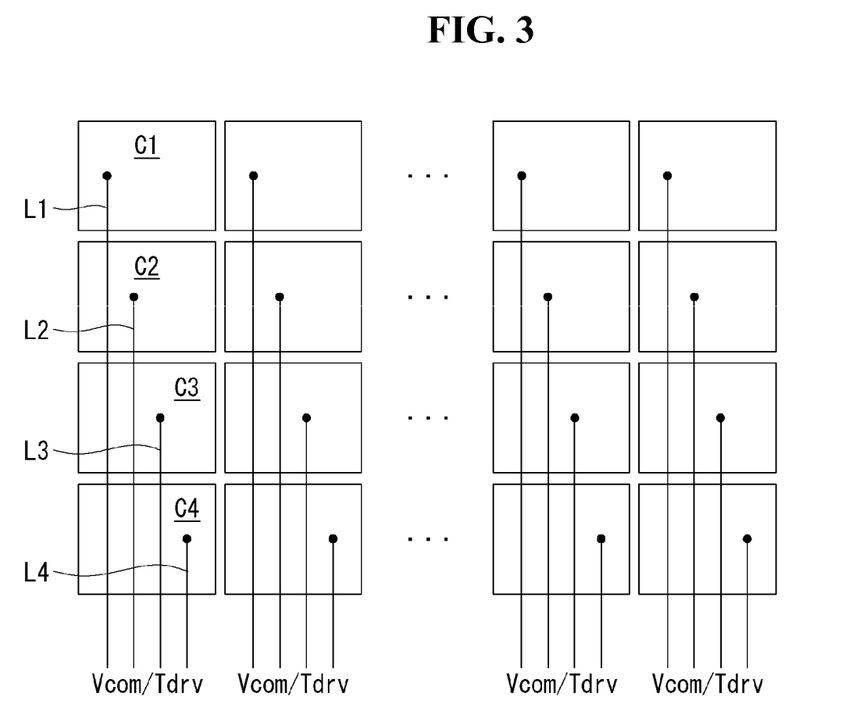
FIG. 3 is a diagram illustrating a self-capacitance type touch sensor.
Figure 4:
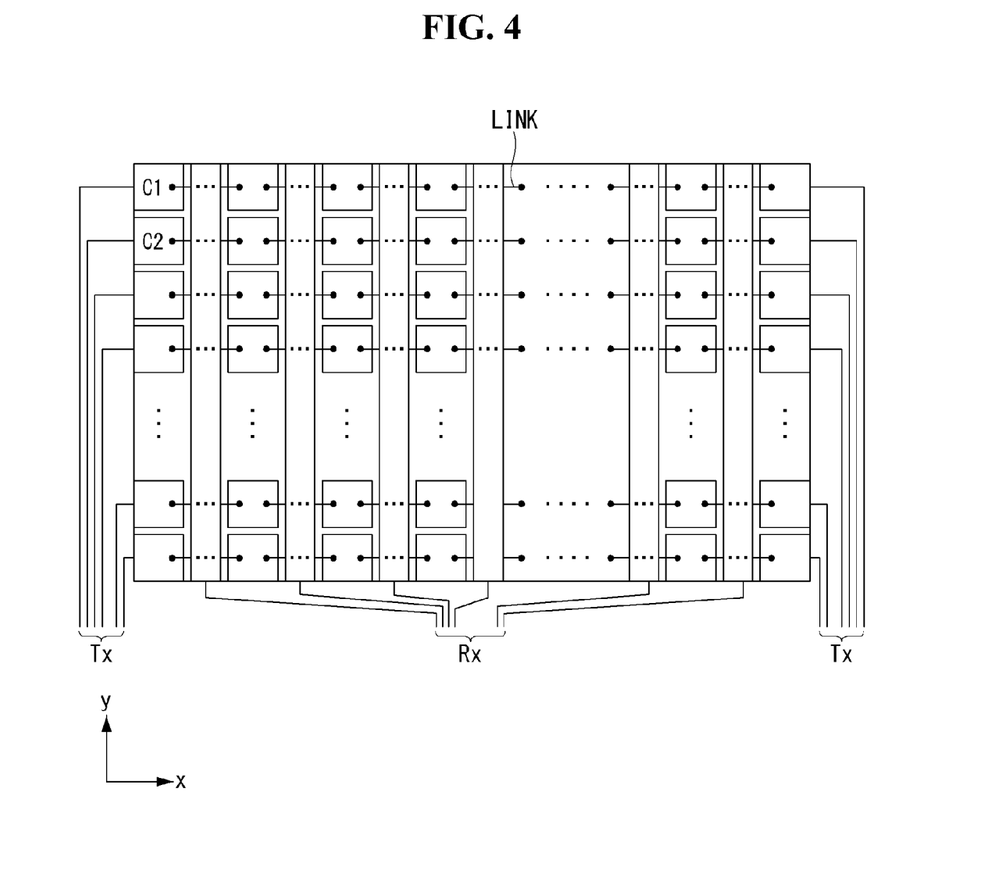
FIG. 4 is a diagram illustrating a mutual capacitance type touch sensor.
Figure 5:
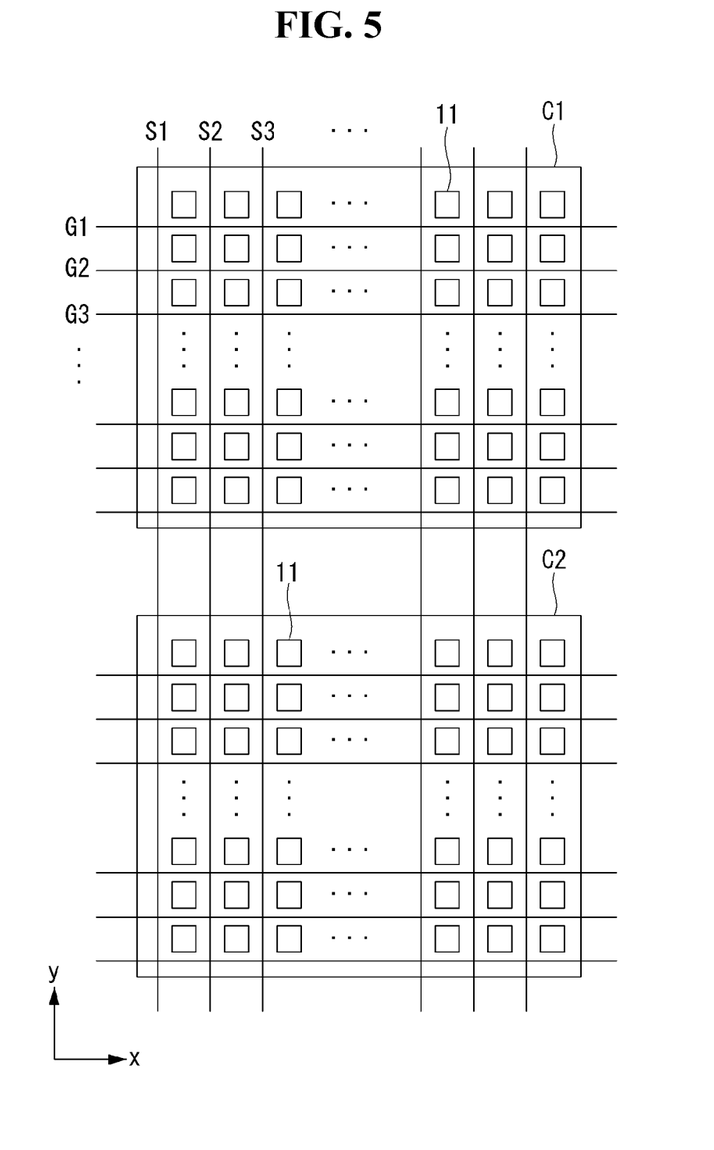
FIG. 5 is an enlarged diagram of the electrode pattern of an in-cell touch sensor.
Figure 6:
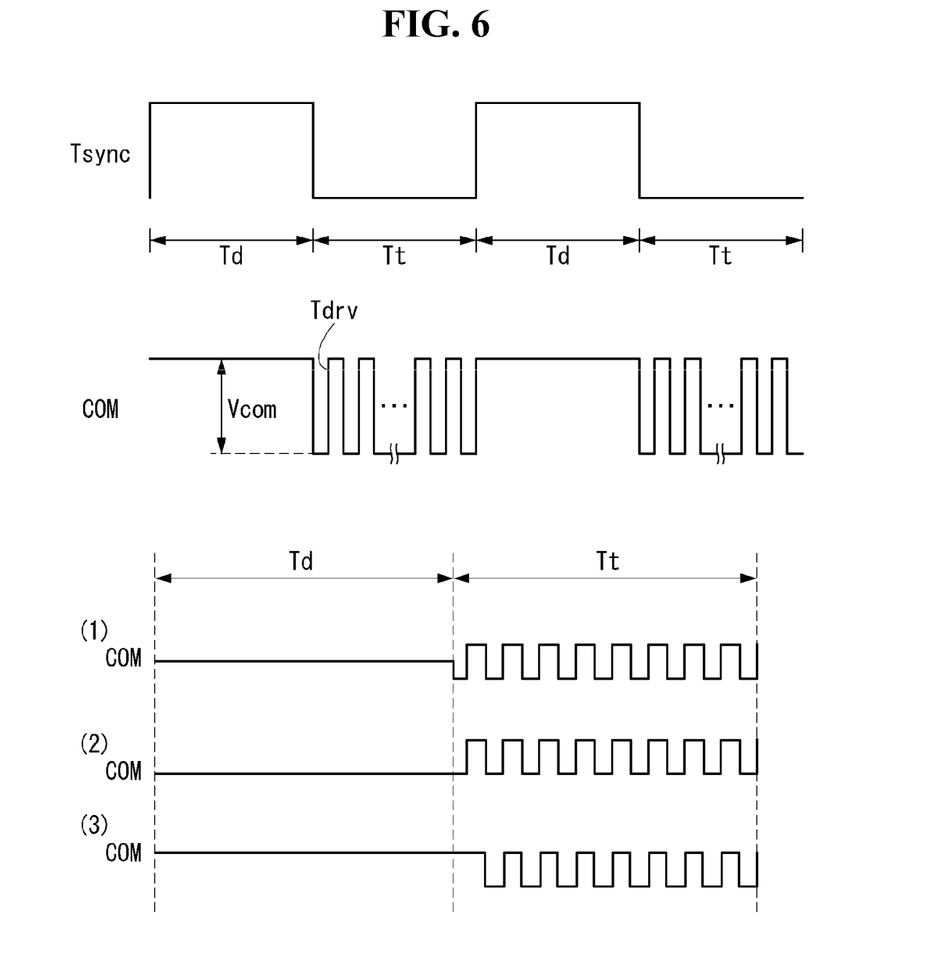
FIG. 6 is a waveform diagram illustrating a time-dividing driving method of a display driving period and a touch sensor driving period.

FIGS. 1 and 2 are diagrams illustrating a display device in accordance with an embodiment of the present application. FIGS. 3 to 5 are diagrams illustrating the electrode patterns of touch sensors. FIG. 5 is an enlarged diagram of the electrode pattern of an in-cell touch sensor. FIG. 6 is a waveform diagram illustrating a time-dividing driving method of a display driving period and a touch sensor driving period.

Referring to FIGS. 1 to 6, the display device in accordance with an embodiment of the present application may include in-cell touch sensors. The in-cell touch sensors are embedded in a pixel array, and sense touch input.

The display device in accordance with an embodiment of the present application includes the pixel array in which the in-cell touch sensors are embedded. The display device may be subject to time division into a first period and a second period. The first period may be a display driving period in which the data of an input video is written in pixels. The second period may be a touch sensor driving period in which the touch sensors are driven and sense touch input.

The in-cell touch sensors may be implemented using capacitance type touch sensors. A common electrode 12 is segmented into in-cell touch sensors C1~C4. The in-cell touch sensors C1~C4 may be operate using either self-capacitance or mutual capacitance. As illustrated in FIG. 3, sensor lines L1~L4 are respectively connected to the touch sensors C1~C4 of self-capacitance type in-cell touch sensors. As illustrated in FIG. 4, in mutual capacitance type in-cell touch sensors, lines are divided into Tx lines and Rx lines crossing the Tx lines. The Tx lines and the Rx lines are coupled through mutual capacitance. Divided Tx line patterns are separated from the Rx lines, and separated Tx line patterns are connected through line patterns LINK, thus forming the Tx lines. The line patterns LINK are separated from the Rx lines through an insulating layer. During the touch sensor driving period, a touch sensor driving signal Tdrv, that is, an AC signal, is supplied to the in-cell touch sensors C1~C4.

A common voltage Vcom is supplied to the in-cell touch sensors C1~C4 during the display driving period, and the touch sensor driving signal Tdrv is supplied to the in-cell touch sensors C1~C4 during the touch sensor driving period. The common voltage has been illustrated as being a common voltage applied to the pixels of an LCD, but the present application is not limited thereto. For example, the common voltage may be construed as being a voltage supplied to the pixels of a flat panel display device in common, such as a high-potential/low-potential power source voltage VDD/VSS supplied to the pixels of an OLED in common.

In the LCD, a liquid crystal layer is formed between two sheets of substrates of a display panel 100. The liquid crystal molecules of the liquid crystal layer are driven by an electric field generated due to a potential difference between the data voltage of an input video applied to a pixel electrode 11 and the common voltage Vcom applied to the common electrode 12. The pixel array of the display panel 100 includes pixels defined by data lines S1~Sm (m is a positive integer) and gate lines G1~Gn (n is a positive integer), the in-cell touch sensors C1~C4 segmented from the common electrode 12, and sensor wires connected to the in-cell touch sensors C1~C4. The sensor wires may include the sensor lines L1~L4 of FIG. 3 and the Tx and the Rx lines of FIG. 4. The pixel electrodes 11 and the segmented common electrodes 12 may be made of a transparent conductive substance, for example, Indium Tin Oxide (ITO).

Each of the pixels may include a pixel Thin Film Transistors (TFT) formed at the intersection of each of the data lines S1~Sm and each of the gate lines G1~Gn, a pixel electrode 11 supplied with the data voltage through the pixel TFT, the common electrode 12 supplied with the common voltage Vcom, and a storage capacitor Cst connected to the pixel electrode 11 and configured to maintain the voltage of a liquid crystal cell. The in-cell touch sensors C1~C4 and sensor wires connected thereto function as the common electrodes during the display driving period. Each of the in-cell touch sensors C1~C4 is connected to a plurality of pixels as illustrated in FIG. 5.

Black matrices, color filters, etc. may be formed in the upper substrate of the display panel 100. The lower substrate of the display panel 100 may have a Color filter On TFT (OCT) structure. In this case, the color filters may be formed in the lower substrate of the display panel 100. An orientation film configured to have a polarization plate attached thereto and to set the pre-tilt angle of liquid crystals on internal surface thereof coming in contact with the liquid crystals may be formed on each of the upper substrate and lower substrate of the display panel 100. A column spacer for maintaining the cell gap of the liquid crystal layer is formed between the upper substrate and lower substrate of the display panel 100.

A backlight unit may be disposed under the back of the display panel 100. The backlight unit is implemented using an edge type or direct type backlight unit, and radiates light to the display panel 100. The display panel 100 may be implemented using any known liquid crystal mode, such as Twisted Nematic (TN) mode, Vertical Alignment (VA) mode, In Plane Switching (IPS) mode, or Fringe Field Switching (FFS) mode. In a self-emitting display device, such as an OLED display device, the backlight unit is not required.

The display device in accordance with an embodiment of the present application may further include a display driving unit 102, 104, 106 (e.g., a circuit) for writing the data signals of an input video to the pixels and a touch sensor driving unit 110 for driving the touch sensors.

As illustrated in FIG. 6, the driving period of the display device is subject to time division into the display driving period Td and the touch sensor driving period Tt. The display driving unit 102, 104, 106 and the touch sensor driving unit 110 are synchronized in response to a sync signal Tsync. The first logic level of the sync signal Tsync defines the display driving period Td, and the second logic level thereof defines the touch sensor driving period Tt. The first logic level may be a high logic level and the second logic level may be a low logic level as illustrated in FIG. 6, and vice versa. In FIG. 6, COM is a signal waveform applied to the in-cell touch sensors.

A voltage applied to the in-cell touch sensors may be any one of (1), (2), and (3) of FIG. 6 depending on power applied to a system. As illustrated in (1), if a difference between the common voltage Vcom and a ground voltage GND is small, the amplitude of the touch sensor driving signal Tdrv may be limited. In this case, the common voltage Vcom and the touch sensor driving signal Tdrv may be generated in a form, such as (2).

If the common voltage Vcom is high, positive polarity power may be limited, and the touch sensor driving signal Tdrv may have a limited amplitude. In this case, the common voltage Vcom and the touch sensor driving signal Tdrv may be generated in a form, such as (3).

The display driving unit 102, 104, 106 writes the data of an input video in pixels during the display driving period Td. The pixels hold a data voltage charged in the display driving period Td because the pixels TFT of the pixels have an off state during the touch sensor driving period Tt. The display driving unit 102, 104, 106 supplies the signal lines S1~Sm and G1~Gn with an AC signal Vac having the same phase as the touch driving signal Tdrv in order to minimize parasitic capacitance between the touch sensors and the signal lines S1~Sm and G1~Gn connected to the pixels during the touch sensor driving period Tt.

The display driving unit 102, 104, 106 includes the data driving unit 102, the gate driving unit 104, and the timing controller 106.

The data driving unit 102 converts the digital video data RGB of an input video, received from the timing controller 106 during the display driving period Td, into an analog/negative polarity gamma compensation voltage and outputs a data voltage. The data voltage output by the data driving unit 102 is supplied to the data lines S1-Sm.

The data driving unit 102 supplies the data lines S1~Sm with the data voltage of an input video during the display driving period Td, connects the data lines S1~Sm during the touch sensor driving period Tt, and supplies the AC signal Vac to the connected data lines S1~Sm. The AC signal Vac is not related to the data of the input video. The AC signal Vac is generated in phase with the touch driving signal Tdrv. Accordingly, the data driving unit 102 supplies the data lines S1~Sm with the AC signal Vac having the same phase as the touch driving signal Tdrv applied to the in-cell touch sensors C1~C4, during the touch sensor driving period Tt, thereby minimizing parasitic capacitance between the in-cell touch sensors C1~C4 and the data lines S1~Sm. The reason for this is that voltages across parasitic capacitance are simultaneously changed and the amount of charges charged in the parasitic capacitance is reduced according to a reduction in the difference between the voltages.

The gate driving unit 104 (e.g., a circuit) selects a line of the display panel 100 in which a data voltage is written by sequentially supplying the gate lines G1~Gn with a gate pulse (or scan pulse) synchronized with the data voltage during the display driving period Td. The gate pulse swings between a gate high voltage VGH and a gate low voltage VGL. The gate pulse is applied to the gates of the pixels TFTs through the gate lines G1~Gn. The gate high voltage VGL is set to be higher than the threshold voltage of the pixel TFT, and turns on the pixel TFT. The gate low voltage VGL is lower than the threshold voltage of the pixel TFT.

The gate driving unit 104 supplies the gate lines G1~Gn with the AC signal Vac having the same phase as the touch driving signal Tdrv applied to the touch sensors during the touch sensor driving period Tt, thereby minimizing parasitic capacitance between the touch sensor and the gate line. During the touch sensor driving period Tt, the voltage of the AC signal Vac applied to the gate lines G1~Gn may be lower than the gate high voltage VGH and higher than the threshold voltage of the pixel TFT so that data written in the pixels is not changed.

The timing controller 106 receives timing signals, such as a vertical sync signal Vsync, a horizontal sync signal Hsync, a data enable signal DE, and a main clock MCLK, from a host system 108 and synchronizes operation timing of the data driving unit 102 (e.g., a circuit) and the gate driving unit 104. A scan timing control signal may include a gate start pulse GSP, a gate shift clock GSC, and gate output enable GOE. A data timing control signal may include a source sampling clock SSC, a polarity control signal POL, and source output enable SOE.

The host system 108 may be implemented into any one of a television system, a set-top box, a navigation system, a DVD player, a Blueray player, a personal computer (PC), a home theater system, and a phone system. The host system 108 includes a System on Chip (SoC) having a scaler embedded therein and converts the digital video data of an input video into a format suitable for the resolution of the display panel 100. The host system 108 sends the timing signals Vsync, Hsync, DE, and MCLK to the timing controller 106 along with the digital video data RGB of an input video. Furthermore, the host system 108 executes an application associated with information about the coordinates XY of touch input received from the touch sensor driving unit 110 (e.g., a circuit).

The timing controller 106 or the host system 108 may generates a sync signal Tsync for synchronizing the display driving unit 102, 104, 106 and the touch sensor driving unit 110.

The touch sensor driving unit 110 supplies the touch driving signal Tdrv to the in-cell touch sensors C1~C4 during the touch sensor driving period Tt. When a conductor, such as a finger, becomes close to the in-cell touch sensor, the amount of charges of capacitance is changed. The touch sensor driving unit 110 detects a touch location and a touch area by measuring a change of charges in the in-cell touch sensor. The touch sensor driving unit 110 calculates information about the coordinates XY of each of touch inputs and sends the information to the host system 108.

The data driving unit 102 and the touch sensor driving unit 110 may be integrated in a single drive IC. The drive IC may be bonded to the substrate of the display panel 100 using a Chip on Glass (COG) process.

Figure 7:
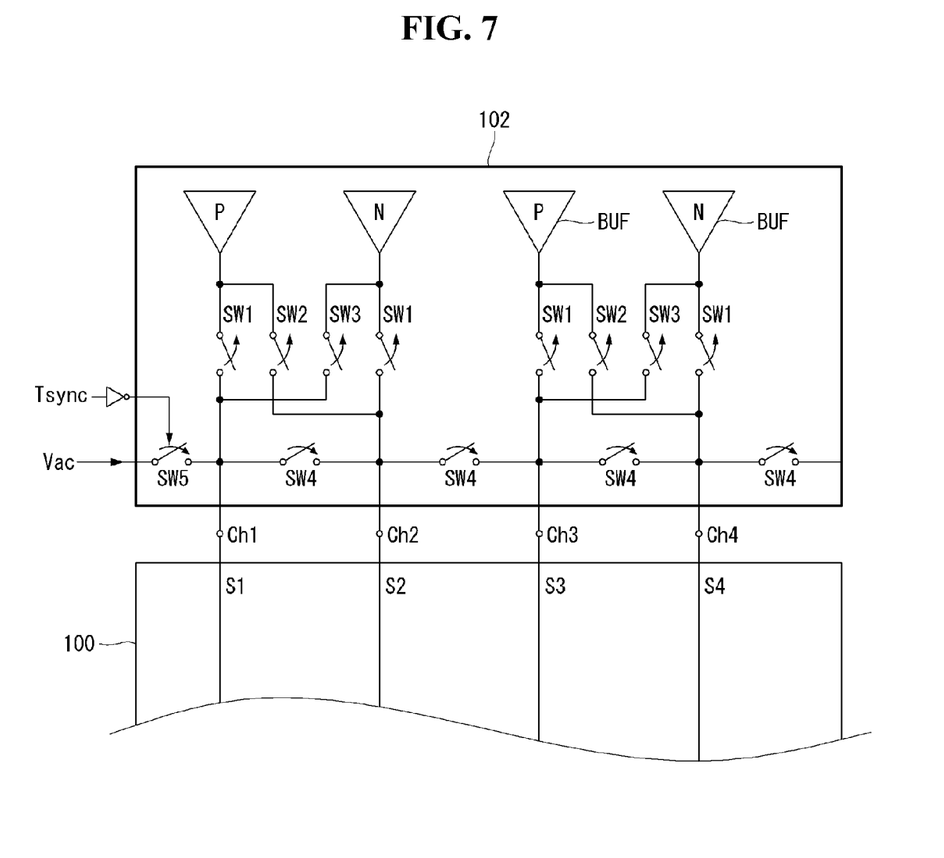
FIG. 7 is a detailed circuit diagram of a data driving unit.
Figure 8:
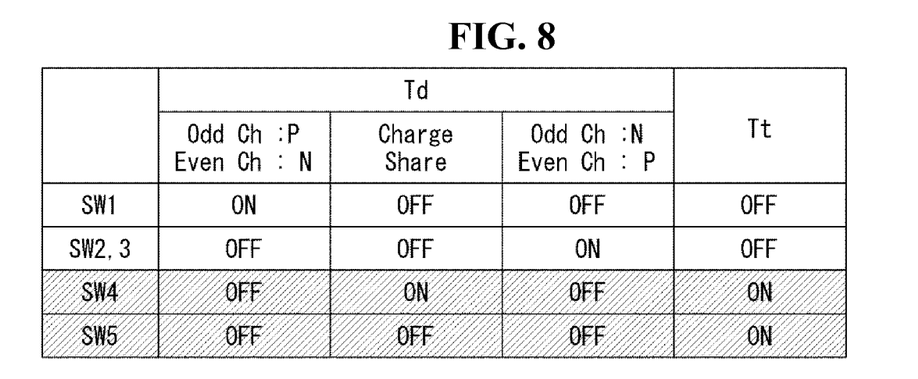
FIG. 8 is a diagram illustrating operation timing of switch elements illustrated in FIG. 7.
Figure 9:
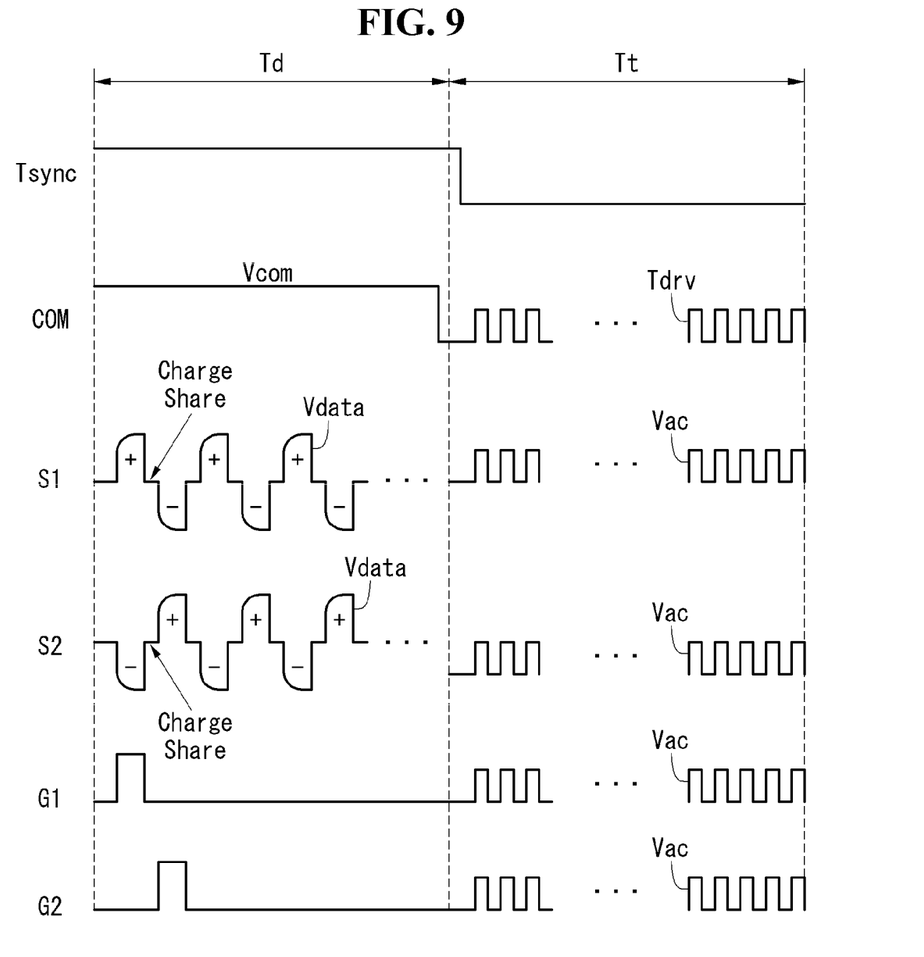
FIG. 9 is a waveform diagram illustrating signals applied to in-cell touch sensors, data lines, and gate lines in the display driving period and the touch sensor driving period.

FIG. 7 is a detailed circuit diagram of the data driving unit 102. FIG. 8 is a diagram illustrating operation timing of switch elements SW1~SW5 illustrated in FIG. 7. FIG. 9 is a waveform diagram illustrating signals applied to the in-cell touch sensors, the data lines, and the gate lines in the display driving period and the touch sensor driving period.

Referring to FIGS. 7 to 9, the data driving unit 102 comprises a plurality of buffers BUF, and a plurality of the switch elements SW1~SW5.

In FIG. 7, Ch1~Ch4 are the output channels of the data driving unit 102. The output channels Ch1~Ch4 are connected to the data lines S1~Sm of the display panel 100. The odd-numbered output channels Ch1 and Ch3 may be connected to the odd-numbered data lines S1 and S3, and the even-numbered output channels Ch2 and Ch4 may be connected to the even-numbered data lines S2 and S4, but the present application is not limited thereto. For example, a multiplexer (MUX) (not illustrated) may be installed between the data driving unit 102 and the data lines S1-Sm. The MUX distributes a single output channel to a plurality of the data lines. In this case, one of the output channels of the data driving unit 102 is connected to the plurality of data lines through the MUX.

The data driving unit 102 may further include Digital-to-Analog Converters (hereinafter called a "DACs") (not illustrated). The DAC converts the digital video data of an input video into a positive polarity/negative polarity gamma compensation voltage and outputs a positive polarity/negative polarity data voltage. The DAC includes a Positive DAC (PDAC) for converting digital video data into a positive polarity gamma compensation voltage and outputting a positive polarity data voltage +Vdata and a Negative DAC (NDAC) for converting digital video data into a negative polarity gamma compensation voltage and outputting a negative polarity data voltage −Vdata. A buffer BUF includes a P buffer BUF connected to the PDAC and an N buffer BUF connected to the NDAC.

The switch elements SW1~SW5 include a first switch element SW1 connected between a first buffer P and a first output channel Ch1, a second switch element SW2 connected between a first buffer P and a second output channel Ch2, a third switch element SW3 connected between the second buffer N and the first output channel Ch1, a fourth switch element SW4 connected between the first and the second output channels Ch1 and Ch2, and a fifth switch element SW5 connected between the first output channel Ch1 and an external AC voltage source. The first buffer BUF may be a P buffer and the second buffer BUF may be an N buffer, and vice versa. The first output channel maybe the odd-numbered output channel Ch1, Ch3, and the second output channel may be the even-numbered output channel Ch2, Ch4, but vice versa. In FIG. 8, "Odd Ch" denotes the odd-numbered output channel Ch1, Ch3, and "Even Ch" denotes the even-numbered output channel Ch2, Ch4. Although not illustrated, the external AC voltage source connected to the fifth switch element SW5 generates the AC signal Vac having the same phase as the touch driving signal Tdrv. The external AC voltage source may be embedded in the display driving unit 102, 104, 106 or the touch sensor driving unit 110 or may be installed as a separate element.

The first to third switch elements SW1~SW3 are driven during the display driving period Td, and output the data voltage Vdata to the first and the second output channels Ch1~Ch4. The first switch element SW1 is turned on under the control of the timing controller 106, and outputs the data voltage +Vdata or −Vdata of a first polarity to the first output channel Ch1, Ch3. The second switch element SW2 is turned on under the control of the timing controller 106, and outputs the data voltage +Vdata or −Vdata of the first polarity to the second output channel Ch2, Ch4. The third switch element SW3 is turned on under the control of the timing controller 106, and outputs the data voltage −Vdata or +Vdata of a second polarity to the first output channel Ch1, Ch3.

The fourth switch SW4 is turned on during the display driving period Td and during the touch sensor driving period Tt under the control of the timing controller 106. The fourth switch SW4 is turned on in a horizontal blank period between two data voltages during the display driving period Td. In the horizontal blank period, a data voltage is not supplied to the data lines between an $n^{th}$ (n is a positive integer) data voltage and an $(n+1)^{th}$ data voltage. The fourth switch SW4 connects the first output channel Ch1, Ch3 and the second output channel Ch2, Ch4 in the horizontal blank period and performs charge sharing. As a result, a mean voltage between the positive polarity data voltage +Vdata and the negative polarity data voltage −Vdata is applied to the data lines S1~Sm in the horizontal blank period. The fourth switch SW4 is turned off in each of an $n^{th}$ data voltage supply period and $(n+1)^{th}$ data voltage supply period that are consecutive within the display driving period Td, thereby separating adjacent output channels. The horizontal blank period is present between the $n^{th}$ data voltage supply period and the $(n+1)^{th}$ data voltage supply period.

The fourth switch SW4 is turned on during the touch sensor driving period Tt under the control of the timing controller 106. As a result, the data lines S1-Sm are connected during the touch sensor driving period Tt, thus maintaining a short circuit state.

The fifth switch SW5 is turned on during the touch sensor driving period Tt under the control of the timing controller 106, and supplies the AC signal Vac to any one of the output channels Ch1~Ch4. As a result, during the touch sensor driving period Tt, the AC signal Vac is supplied to all the data lines S1~Sm maintaining a short circuit state through the fourth switch elements SW4.

In an embodiment of the present application, the AC signal Vac is supplied during the touch sensor driving period Tt using the fourth and the fifth switches SW4 and SW5. Accordingly, a video data signal in the display driving period Td and the AC signal Vac in the touch sensor driving period Tt can be supplied to the data lines S1~Sm without an increase in the chip size of an IC in which the data driving unit 102 has been integrated.

As described above, in an embodiment of the present application, the AC signal is supplied to data lines in the state in which the data lines have been connected each other during the touch sensor period. As a result, a video data signal in the display driving period and the AC signal in the touch sensor driving period can be supplied to the data lines without an increase in the chip size of an IC in which the data driving unit has been integrated.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch display device, comprising:
   a timing controller to generate a sync signal for controlling timing of a touch sensor driving period and a display driving period in each of a plurality of frames, the touch sensor driving period and the display driving period alternating with each other;
   a display panel comprising a plurality of display pixels having a common electrode segmented into a plurality of touch sensors, the plurality of display pixels to display pixel data in response to data voltages during the display driving period;
   a touch sensor driving circuit to supply a touch sensor driving signal to the plurality of touch sensors during the touch sensor driving period and to detect if a touch occurred based on a change in charge on the touch sensors;
   a plurality of positive polarity output buffers to output positive polarity data voltages to the display pixels during the display driving period;
   a plurality of negative polarity output buffers to output negative polarity data voltages to the display pixels during the display driving period;
   a first set of switches to couple the plurality of positive polarity output buffers to respective odd signal lines and to couple the plurality of negative polarity output buffers to respective even signal lines during a first phase of the display driving period;
   a second set of switches to couple the plurality of positive polarity output buffers to respective even signal lines during a second phase of the display driving period;
   a third set of switches to couple the plurality of negative polarity output buffers to respective odd signal lines during the second phase of the display driving period;
   a fourth set of switches to couple the signals lines to each other during a charge share period between the first phase of the display driving period and the second phase of the display driving period, and to couple the signals lines to each other during the touch sensor driving period; and
   a fifth switch to couple the signal lines to an oscillating input voltage during the touch sensor driving period, the oscillating input voltage having an approximately same phase as the touch sensor driving signal.

2. The touch display device of claim 1, wherein for a given odd signal line, a first one of the first set of switches couples the given odd signal line to one of the positive polarity output buffers during the first phase of the display driving period, and one of the third set of switches couples the given odd signal line to one of the negative polarity output buffers during the second phase of the display driving period.

3. The touch display device of claim 2, wherein for a given even signal line, a second one of the first set of switches couples the given even signal line to the one of the negative polarity output buffers during the first phase of the display driving period, one of the second set of switches couples the given even signal line to the one of the positive polarity output buffers during the second phase of the display driving period.

4. A touch display device, comprising:
   a timing controller to generate a sync signal for controlling timing of a touch sensor driving period and a display driving period in each of a plurality of frames, the touch sensor driving period and the display driving period alternating with each other, the display driving period comprising a first phase to drive odd signal lines according to a first polarity and to drive even signal lines according to a second polarity, a second phase to drive the odd signal lines according to the second polarity and to drive the even signal lines according to the first polarity, and a charge share period between the first phase and the second phase;
   a display panel comprising a plurality of display pixels having a common electrode segmented into a plurality of touch sensors, the plurality of display pixels to display pixel data in response to data voltages during the display driving period;
   a touch sensor driving circuit to supply a touch sensor driving signal to the plurality of touch sensors during the touch sensor driving period and to detect if a touch occurred based on a change in charge on the touch sensors;
   a set of charge sharing switches to couple the odd and even signal lines together during the charge share period and to couple the odd and even signal lines together during the touch sensor driving period; and
   a timing switch to couple the odd and even signal lines to receive an oscillating signal during the touch period and to decouple the odd and even signal lines from the oscillating signal during the display driving period.

5. The touch display device of claim 4, further comprising:
   a plurality of positive polarity output buffers to output data voltages having the first polarity;
   a plurality of negative polarity output buffers to output data voltages having the second polarity;
   a first set of switches to couple the plurality of positive polarity output buffers to the odd signal lines and to couple the plurality of negative polarity output buffers to the even signal lines during the first phase of the display driving period; and
   a second set of switches to couple the plurality of positive polarity output buffers to the even signal lines during the second phase of the display driving period.

6. The touch display device of claim 5, further comprising:
   a third set of switches to couple the plurality of negative polarity output buffers to the odd signal lines during the second phase of the display driving period.

7. The touch display device of claim 6, wherein for a given odd signal line, a first one of the first set of switches couples the given odd signal line to a first one of the positive polarity output buffers during the first phase of the display driving period, and one of the third set of switches couples the given odd signal line to one of the negative polarity output buffers during the second phase of the display driving period.

8. The touch display device of claim 7, wherein for a given even signal line, a second one of the first set of switches couples the given even signal line to the one of the negative polarity output buffers during the first phase of the display driving period, and one of the second set of switches couples the given even signal line to the one of the positive polarity output buffers during the second phase of the display driving period.

9. The touch display device of claim 4, wherein the oscillating signal has an approximately same phase as the touch sensor driving signal during the touch sensor driving period.

10. A method for operating a touch display device, the method comprising:
    generating, by a timing controller, a sync signal for controlling timing of a touch sensor driving period and a display driving period in each of a plurality of frames, the touch sensor driving period and the display driving period alternating with each other, the display driving period comprising a first phase, a second phase, and a charge share period between the first and second phases;

driving odd signal lines of a display panel according to a first polarity and even signal lines according to a second polarity during the first phase of the display driving period;

driving the odd signal lines of the display panel according to the second polarity and the even signal lines according to the first polarity during the second phase of the display driving period;

displaying, by the display panel, pixel data in response to data voltages driven onto the odd and even signal lines during the display driving period, the display panel comprising a plurality of display pixels having a common electrode segmented into a plurality of touch sensors;

controlling a set of charge sharing switches to couple the odd and even signal lines together during the charge share period to distribute charge between the odd signal lines and the even signal lines, and to couple the odd and even signal lines together during the touch sensor driving period;

supplying, by a touch sensor driving circuit, a touch sensor driving signal to the plurality of touch sensors during the touch sensor driving period;

detecting, by the touch sensor driving circuit, if a touch occurred during the touch sensor driving period based on a change in charge on the touch sensors; and controlling a timing switch to couple the odd and even signal lines to receive a oscillating signal during the touch sensor driving period and to decouple the odd and even signal lines from the oscillating signal during the display driving period.

11. The method of claim 10, further comprising:
outputting data voltages having the first polarity from a plurality of positive polarity output buffers;
outputting data voltages having the second polarity from a plurality of negative polarity output buffers;
controlling a first set of switches to couple the plurality of positive polarity output buffers to the odd signal lines and to couple the plurality of negative polarity output buffers to the even signal lines during the first phase of the display driving period; and
controlling a second set of switches to couple the plurality of positive polarity output buffers to the even signal lines during the second phase of the display driving period.

12. The method of claim 11, further comprising:
controlling a third set of switches to couple the plurality of negative polarity output buffers to the odd signal lines during the second phase of the display driving period.

13. The method of claim 12, further comprising:
controlling a first one of the first set of switches to couple a given odd signal line to one of the positive polarity output buffers during the first phase of the display driving period; and
controlling one of the third set of switches to couple the given odd signal line to one of the negative polarity output buffers during the second phase of the display driving period.

14. The method of claim 13, further comprising:
controlling a second one of the first set of switches to couple a given even signal line to the one of the negative polarity output buffers during the first phase of the display driving period;
controlling one of the second set of switches to couple the given even signal line to the one of the positive polarity output buffers during the second phase of the display driving period.

15. The method of claim 10, wherein the oscillating has an approximately same phase as the touch sensor driving signal.

* * * * *